United States Patent
Mao et al.

(10) Patent No.: US 7,031,909 B2
(45) Date of Patent: Apr. 18, 2006

(54) METHOD AND SYSTEM FOR NAMING A CLUSTER OF WORDS AND PHRASES

(75) Inventors: Jianchang Mao, San Jose, CA (US); Sumit Taank, Austin, TX (US); Christina Chung, Sunnyvale, CA (US); Alpha Luk, San Jose, CA (US)

(73) Assignee: Verity, Inc., Sunnyvale, CA (US)

( * ) Notice: Subject to any disclaimer, the term of this patent is extended or adjusted under 35 U.S.C. 154(b) by 864 days.

(21) Appl. No.: 10/096,048

(22) Filed: Mar. 12, 2002

(65) Prior Publication Data

US 2003/0177000 A1    Sep. 18, 2003

(51) Int. Cl.
*G06F 17/20* (2006.01)
*G06F 17/28* (2006.01)

(52) U.S. Cl. .................. 704/9; 707/3; 715/532
(58) Field of Classification Search .............. None
See application file for complete search history.

(56) References Cited

U.S. PATENT DOCUMENTS

| | | | | |
|---|---|---|---|---|
| 5,056,021 A | * | 10/1991 | Ausborn ................ | 704/9 |
| 5,237,503 A | * | 8/1993 | Bedecarrax et al. ...... | 704/10 |
| 5,721,902 A | * | 2/1998 | Schultz ................ | 707/4 |
| 5,794,050 A | * | 8/1998 | Dahlgren et al. ........ | 717/144 |
| 5,873,056 A | * | 2/1999 | Liddy et al. ........... | 704/9 |
| 6,076,088 A | * | 6/2000 | Paik et al. ............ | 707/5 |
| 6,260,008 B1 | * | 7/2001 | Sanfilippo ............ | 704/9 |
| 6,510,406 B1 | * | 1/2003 | Marchisio ............. | 704/9 |
| 6,675,159 B1 | * | 1/2004 | Lin et al. ............ | 707/3 |

* cited by examiner

Primary Examiner—Susan McFadden
(74) Attorney, Agent, or Firm—William L. Botjer (57) ABSTRACT

The present invention provides a method, system and computer program for naming a cluster, or a hierarchy of clusters, of words and phrases that have been extracted from a set of documents. The invention takes these clusters as the input and generates appropriate labels for the clusters using a lexical database. Naming involves first finding out all possible word senses for all the words in the cluster, using the lexical database; and then augmenting each word sense with words that are semantically similar to that word sense to form respective definition vectors. Thereafter, word sense disambiguation is done to find out the most relevant sense for each word. Definition vectors are clustered into groups. Each group represents a concept. These concepts are thereafter ranked based on their support. Finally, a pre-specified number of words and phrases from the definition vectors of the dominant concepts are selected as labels, based on their generality in the lexical database. Therefore, the labels may not necessarily consist of the original words in the cluster. A hierarchy of clusters is named in a recursive fashion starting from leaf clusters. Dominant concepts in child clusters are propagated into their parent to reduce the labeling complexity of parent clusters.

48 Claims, 4 Drawing Sheets

METHOD AND SYSTEM FOR NAMING A CLUSTER OF WORDS AND PHRASES

BACKGROUND OF THE INVENTION

1. Field of the Invention

The present invention relates to automatically naming a set of documents for document organization, and deals more particularly with a method, system and computer program for naming a cluster of words and phrases, using a lexical database to provide a name that appropriately brings out the essence of the same.

2. Description of the Related Art

A general way of considering all documents is one wherein a document is a collection of words (such as a report, a news article, or a web page), or simply, a collection of characters that can be obtained by typing on a keyboard or a typewriter. With advances in modern technology and an ever-increasing reliance on computers, the quantum of soft documents generated has witnessed a sharp increase. Typically, in large corporations today, hundreds of thousands—or even more—soft documents are generated and stored. This obviously leads to a situation where data or document retrieval becomes difficult and time consuming, and, results in a need for providing a system to classify documents appropriately and efficiently. Clearly, an efficient classification would result in ensuring that related documents are grouped together. Hence this usually results in more efficient retrieval, browsing, and navigation and content organization of the entire document set, thereby making it easier to access the same. For example, a news-provider—who could be newspaper publisher, a radio station, a television station or any other organization providing news—may have documents pertaining to finance, politics, sports, entertainment, classified advertisements, general advertisements, and other topics. If all these documents are clustered together, it will be difficult to efficiently search for a particular news article. Hence, all documents should preferably be classified under relevant subjects and related documents, or similar documents should be clustered together. For example, in most cases, it would make sense that all documents pertaining to sports constitute one category. Similarly, all documents pertaining to finance may fall under one category. Indeed, since the news-provider may have archives of many such documents, their overall quantity tends to become quite large. Hence, in many cases, a further sub-classification may be required. Continuing with the abovementioned example, the category of "sports," may have to be further divided into two or more classes, and as an example, a sub-category or a sub-class that has all articles related to "tennis" (and one that has all articles related to "football") may emerge.

As can be seen from the above discussion, proper classification of documents is indeed an important issue for organizations such as libraries and big corporations that have large quantities of documents. Proper classification helps in logically arranging documents and reduces the time and effort spent on searching for a document on a particular subject.

In order to classify the documents appropriately, it is important to label a cluster of documents in the best manner possible. A label is a descriptive or identifying word or phrase that brings out the essence of the documents and can be used to uniquely identity the same. Traditional classification methods have relied on the author or some other professional (such as a library science professional) to label or index the documents, so that these labels or indices can be further used to classify the documents. Although this option of manually labeling and classifying documents may result in high quality, it is usually time consuming and expensive. However, if the data associated with the set of documents becomes large, the effort involved in manual labeling often becomes monumental, and some times simply not doable. Indeed, in the absence of such manual labeling, one is handicapped due to the lack of any proper automatic labeling method.

In the past, numerous methods have been proposed for automatically generating labels of documents. Most methods use a few words from within the document to constitute the label. In such cases, the labels are simply those that either contain the most frequent or the most descriptive words appearing in the document. Indeed, such methods may not generate labels that bring out the essence of the document completely. For instance, if we continue with the aforementioned example, news articles on football games and tennis games are likely to have the word "reporter" occurring very frequently in them. If these labeling methods of choosing most frequently occurring words as the label were used, the word "reporter" will very likely occur in the label of the category containing the two documents (on football games and tennis games), and may even put these documents in the same category or sub-category! Clearly, since, tennis and football are not related, their classification under the same category or sub-category is not appropriate. This may even result in confusion at the time of searching for the documents. At a minimum, the label "reporter" would not be able to appropriately bring out the context, essence, or the import of any of these documents. Therefore, what is needed is a method to appropriately label a document in a way that brings out the subject matter—including the key concepts and the context—of the document. Hence, all this discussion shows a need for concept based labeling of documents.

One prior art method uses Self-Organizing Maps (SOM) to classify and label documents. Typically, a document has many features, such as frequency of occurrence of a particular keyword associated with it. A document is therefore represented as a feature vector with the feature values (that is, the frequency of occurrence of the corresponding keyword) as its elements. Representing documents in this way enables one to use SOMs and to do cluster analysis of documents. WEBSOM and LabelSOM are two techniques that employ SOMs to cluster and label document collections.

"WEBSOM—Self Organizing Maps of Document Collections", presented in Proc. Workshop on Self-Organizing Maps (WSOM97), Espoo, Finland, 1997 by Timo Honkela, Samuel Kaski, Krista Lagus, and Teuvo Kohonen describes a method that uses a list of documents to extract a set of keywords that act as features for these documents. Suppose there are five documents to be classified and fifty keywords have been extracted out of these documents. These fifty words are used as features for these documents. For each of these documents, a vector of fifty dimensions is generated. Each element in the feature vector will correspond to the frequency of occurrence of the corresponding keyword in the document. These documents are mapped on a two-by-two map. Documents that are "close" to each other according to this distance are clustered together and are mapped close to each other on the map. Hence, this map provides a visual overview of the document collection wherein "similar" documents are clustered together. However, it does not label documents. Moreover, the clustering uses words appearing in the document only.

"LabelSOM: On the Labeling of Self-Organizing Maps", 1999 by Andreas Rauber describes an approach for automatically labeling a SOM (http://www.ifs.tuwien.ac.at/~andi). The output in this method is a N×M grid wherein a cluster of documents is mapped to a grid element, and this cluster is given a label using the words in the documents (that have been mapped to this grid location). Documents to be mapped to a cluster are determined using the Euclidean distance between the documents and the stored feature vector representing the cluster. Each such cluster is thereafter labeled using certain elements from the stored feature vector. This is done by determining the contribution of each element in the feature vector towards the overall Euclidean distance, i.e. those elements are selected to form the label that are the most distinguishing ones for that cluster. The resulting labeled map allows the user to understand the structure and the information available in the map.

However, neither WEBSOM nor LabelSOM addresses the issue of naming a document with a meaningful name or phrase that appropriately brings out the import of the documents. Indeed, both used frequently occurring words in the documents as labels and, in the example given above, these techniques might label news articles with football games and tennis games under the heading of a "reporter". Moreover, the resulted label has to be one or few words appeared in the documents.

"Automated Concept Extraction from Plain Text", AAAI Workshop on Learning for Text Categorization, Madison, July 1998 by Boris Gelfand, Marilyn Wulfekuhler and William F. Punch III describes a system for extracting concepts from unstructured text. This method identifies relationships between words in the text using a lexical database and identifies groups of these words that form closely tied conceptual groups. This method extracts certain semantic features from raw text, which are then linked together in a Semantic Relationship Graph (SRG). The output, SRG, is a graph wherein words that are semantically related (according to the lexical database) are linked to each other. Furthermore, in this graph, if two words are not directly linked to each other but are linked by a connecting word in the lexical database, then this connecting word is added to the graph as an "augmented word" that will connect these two words. For example, if two words, "priest" and "government", appear in the SRG, and if they are not directly related, then it is likely that an "augmented word" such as "authority" will be added in the SRG and it will connect to both the words, "priest" and "government." Finally, SRG is partitioned into sub-graphs in order to obtain classes of various documents. However, this paper does not address the issue of labeling a document or a set of documents; in other words, a strong need still remains as to how such classes should be labeled so that the corresponding labels exhibit the context, concepts, and the import of the documents contained there in.

"Automatic Labeling of Document Clusters", 2000 by Alexandrin Popescul and Lyle H. Ungar describes a method for labeling document clusters (http://www.cis.upenn.edu/~popescul/Publications/labeling_KDD00.pdf). The method uses a statistical method called "$\chi^2$ test of significance" for each word at each node in a hierarchy starting at the root and recursively moving down the hierarchy. If the hypothesis, that a word is equally likely to occur in all of the children of a given node, cannot be rejected, then it is marked as a feature of the current subtree. Thereafter this word is assigned to the current node's bag of node-specific words and removed from all the children nodes. After having reached the leaf nodes, each node is labeled by its bag of node-specific words. However, this labeling is of a very rudimentary form insofar as it merely picks words that exist in the document as the label for the document. These words, when used as labels, may not depict the context, concept, or the exact import of the document.

In addition to the abovementioned research papers on the subject, various patents have also been granted in the area of concept extraction and labeling.

U.S. Pat. No. 5,077,668 titled "Method and apparatus for producing an abstract of a document", U.S. Pat. No. 5,638,543 titled "Method and apparatus for automatic document summarization", U.S. Pat. No. 5,689,716 titled "Automatic method of generating thematic summaries" and U.S. Pat. No. 5,918,240 titled "Automatic method of extracting summarization using feature probabilities" deal with automatically producing abstract of a document that is indicative of the content of the document. In all these inventions, certain phrases and sentences are picked up from the document itself, based on predetermined heuristics, which are then juxtaposed together to form the summary. However, these inventions merely summarize the document and do not address the issue of labeling.

U.S. Pat. No. 5,642,518 titled "Keyword assigning method and system therefor" describes a keyword assigning system for automatically assigning keywords to large amount of text data. The domain-wise keywords are extracted from one of the many available text data inputs based on occurrence frequencies of domain-specific words stored in a memory. Thereafter a text data, which is to be assigned a keyword, is inputted. Finally, a keyword is extracted from the input text data using the domain-wise keywords. This keyword is assigned as the label to the input text data. However, this invention merely extracts words from within the input text data and uses them as labels. The label so assigned may not be very relevant to the document from a contextual point of view.

From a study of the various methods stated above, it is clear that although many attempts have been made at concept extraction and labeling of documents, none of these methods deal with labeling documents in a manner that reveals the context or the key concepts of the documents. Indeed, such methods merely restrict themselves to picking up text from the documents themselves and using these as labels. Therefore, what is needed is a method, system and computer program for labeling a document or a set of documents in a manner that key concepts and its import are clearly brought out. Moreover, not much effort has been made to labeling a set of related words and phrases instead of labeling documents directly.

SUMMARY

An object of the present invention is to provide a method, system and computer program for naming a cluster of words and phrases that have been extracted from a set of documents in a way that the important concept represented by the set of words and phrases is clearly brought out in the label.

Another object of the present invention is to provide a method, system and computer program for naming a cluster of words and phrases wherein a lexical database is used to generate various word senses for words in the input cluster so that all possible meanings for all the words in the input cluster are brought out.

Another object of the present invention is to provide a method, system and computer program for naming a cluster of words and phrases wherein a lexical database is used to generate semantically similar words for each word sense so as to form a definition vector corresponding to each word sense.

Another object of the present invention is to provide a method, system and computer program for naming a cluster of words and phrases wherein support for all definition vectors is determined, so that most relevant definition vectors for each word can be chosen.

Another object of the present invention is to provide a method, system and computer program for naming a cluster of words and phrases wherein final label for the cluster is determined by using the lexical database to find out words that best describe the dominant concepts.

Still another object of the present invention is to provide a method, system and computer program for naming a hierarchy of clusters of words and phrases that have been extracted from a set of documents, using a lexical database.

A further object of the present invention is to provide a method, system and computer program for naming a cluster of words and phrases wherein a user can specify the length of the final label in terms of number of words in the final label.

Yet another object of the present invention is to provide a method, system and computer program for naming a cluster of words and phrases wherein a user can specify the length of the final label in terms of a certain percentage of the number of words in the input cluster.

Other objects and advantages of the present invention will be set forth in part in the description and in the drawings which follow and, in part, will be obvious from the description or may be learned by practice of the invention.

To achieve the foregoing objects, and in accordance with the purpose of the present invention as broadly described herein, the present invention provides for a method, system and computer program for naming a cluster of words and phrases that have been extracted from a document, using a lexical database. The method takes a cluster of words and phrases to be named as an input. Using the lexical database, all possible word senses of all the words in the cluster are generated. Thereafter using the same lexical database, definition vectors are generated for all the word senses by augmenting each word sense with words that are semantically related to that word sense. Thereafter, most relevant definition vector for each word in the input cluster is determined after determining support of individual definition vectors. Thereafter, groups of these chosen definition vectors that exhibit strong support for each other are grouped together. Each of these groups of definition vectors is then ranked based on the sum of support of all members of the group. These groups of definition vectors are regarded as concepts and a predetermined number of top ranked concepts are chosen to be the dominant concepts. Thereafter, the lexical database is used to generate a word/phrase for each of these dominant concepts. These set of words/phrases form the final label for the input cluster.

The present invention also provides for a method, system and computer program for naming clusters of words and phrases that are in a hierarchy that is in the form of a tree, using a lexical database. The invention starts off with the leaf clusters and labels them according to the method described above. It does this for all the leaf clusters. Thereafter, to label a cluster that is not a leaf cluster, it extracts the dominant concepts of the children of the cluster in addition to concepts formed from words in one or more children clusters. This way concepts with low supports in isolated children clusters but with high enough supports in the parent cluster are captured. This procedure is applied to all clusters in the hierarchy in a bottom up fashion starting from leaf clusters to top-level clusters.

The present invention will now be described with reference to the following drawings, in which like reference numbers denote the same elements throughout.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DESCRIPTION OF PREFERRED EMBODIMENTS

Figure 1:
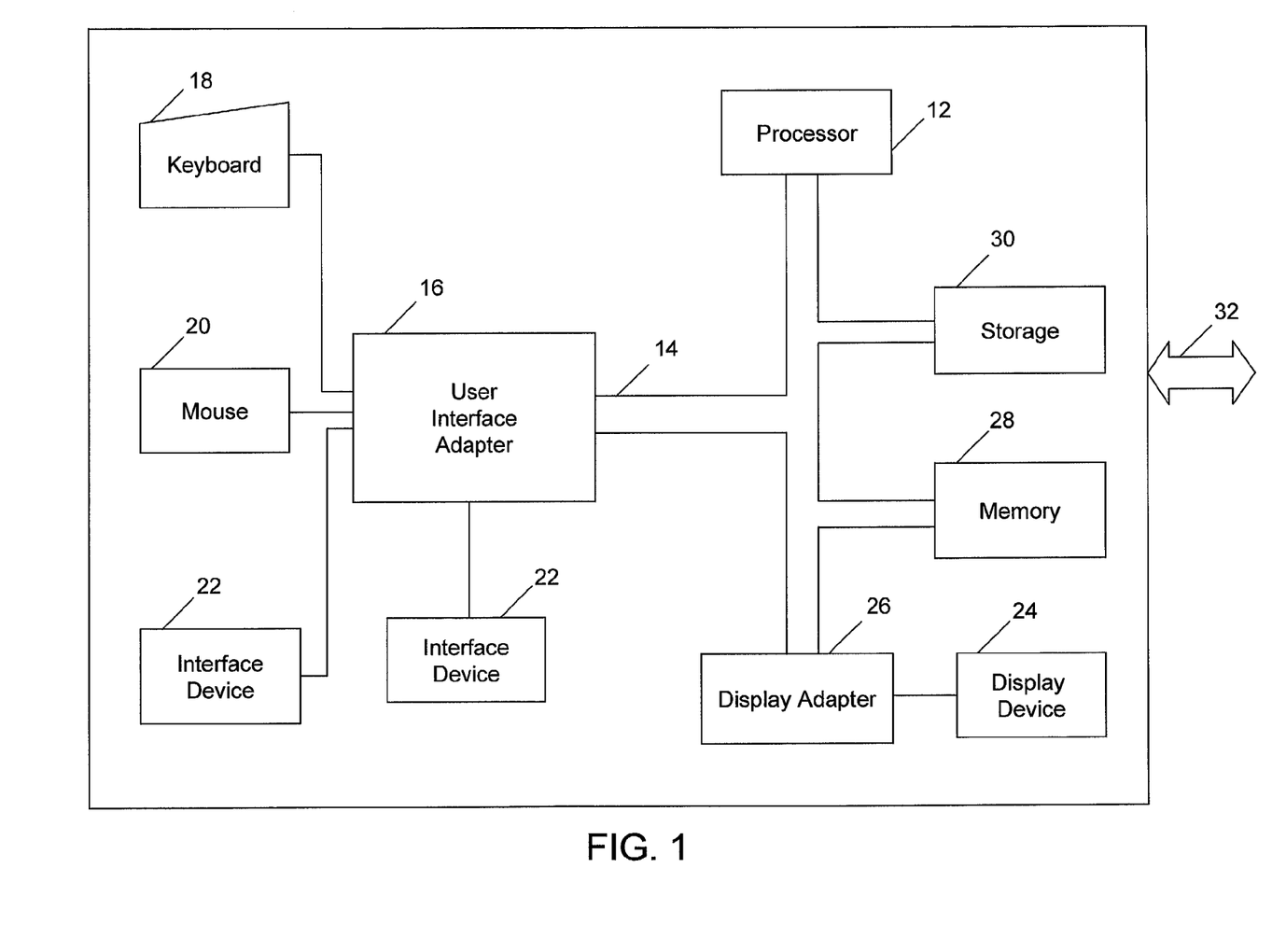
FIG. 1 is a block diagram of a computer workstation environment in which the present invention may be practiced.

FIG. 1 illustrates a representative workstation hardware environment in which the present invention may be practised. The environment of FIG. 1 comprises a representative single user computer workstation 10, such as a personal computer, including related peripheral devices. Workstation 10 includes a microprocessor 12 and a bus 14 employed to connect and enable communication between microprocessor 12 and the components of workstation 10 in accordance with known techniques. Workstation 10 typically includes a user interface adapter 16, which connects microprocessor 12 via bus 14 to one or more interface devices, such as a keyboard 18, mouse 20, and/or other interface devices 22, which may be any user interface device, such as a touch sensitive screen, digitized entry pad, etc. Bus 14 also connects a display device 24, such as an LCD screen or a monitor, to microprocessor 12 via a display adapter 26. Bus 14 also connects microprocessor 12 to memory 28 and long-term storage 30 which may include a hard drive, a diskette drive, a tape drive, etc.

Workstation 10 communicates via a communications channel 32 with other computers or networks of computers. Workstation 10 may be associated with such other computers in a local area network (LAN) or a wide area network, or workstation 10 can be a client in a client/server arrangement with another computer, etc. All of these configurations, as well as the appropriate communications hardware and software, are known in the art.

Figure 2:
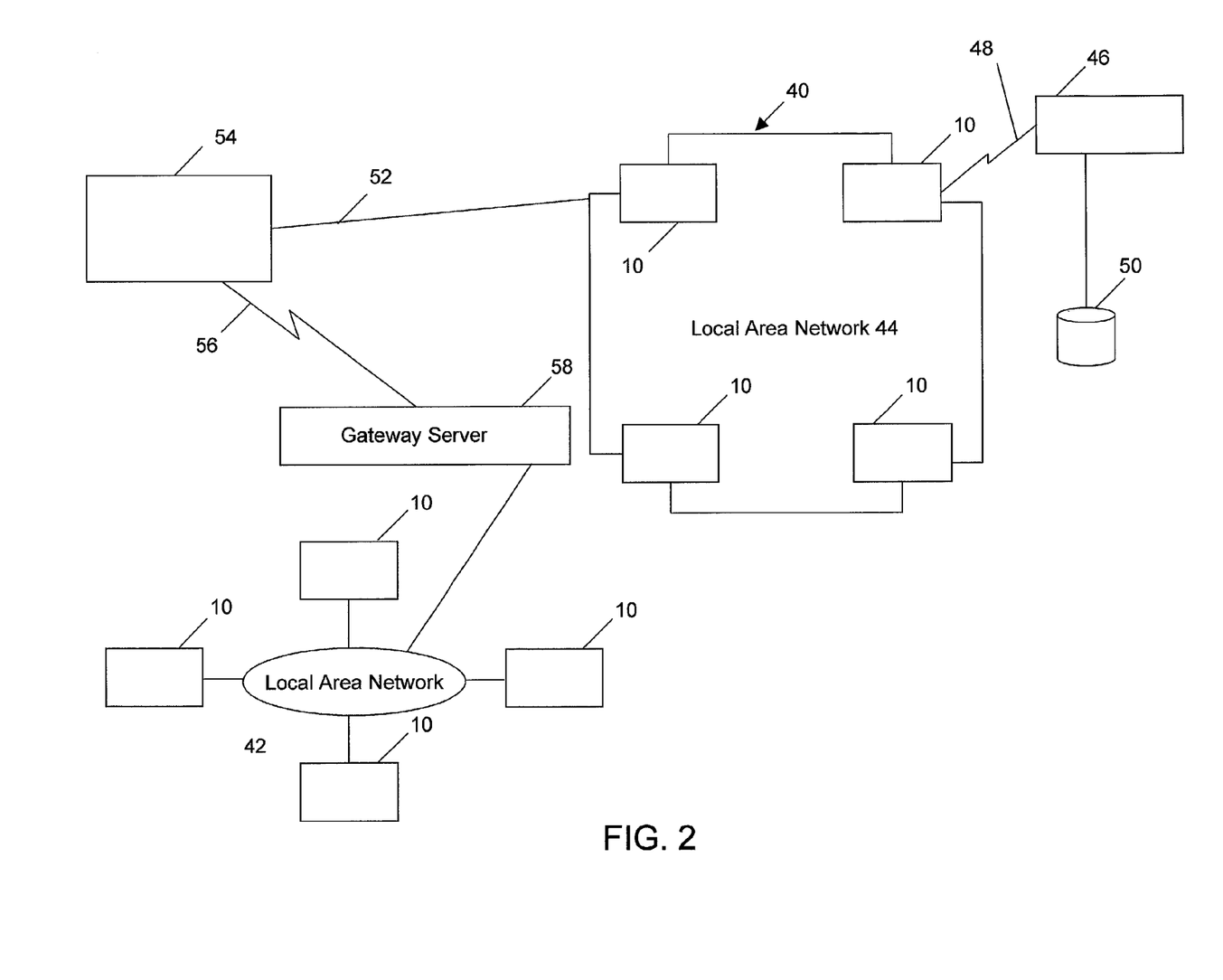
FIG. 2 is a diagram of a networked computing environment in which the present invention may be practiced.

FIG. 2 illustrates a data processing network 40 in which the present invention may be practised. Data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

In FIG. 2, data processing network 40 may also include multiple mainframe computers, such as a mainframe computer 46, which may be preferably coupled to LAN 44 by means of a communications link 48.

Mainframe computer 46 may also be coupled to a storage device 50, which may serve as remote storage for LAN 44.

Similarly, LAN 44 may be coupled to a communications link 52 through a subsystem control unit/communication controller 54 and a communications link 56 to a gateway server 58. Gateway server 58 is preferably an individual computer or intelligent workstation that serves to link LAN 42 to LAN 44.

Those skilled in the art will appreciate that mainframe computer 46 may be located at a large geographic distance from LAN 44, and similarly, LAN 44 may be located at a substantial distance from LAN 42.

Software programming code, which embodies the present invention, is typically accessed by microprocessor 12 of workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in memory 28, and accessed by microprocessor 12 using bus 14. The techniques and methods for embodying software programming code in memory, on physical media, and/or distributing software code via networks are well known and will not be further discussed herein.

The final name resulting from the use of the present invention may be stored on any of the various media types used by long-term storage 30, or may be sent from workstation 10 to another computer or workstation of the network illustrated in FIG. 2 over communications channel 32, for storage by that other computer or work station.

The preferred embodiments of the present invention will now be discussed with reference to the following figures. In the preferred embodiments, the present invention is implemented as a computer software program. The software may execute on the user's computer or on a remote computer that may be connected to the user's computer through a LAN or a WAN that is part of a network owned or managed internally to the user's company, or the connection may be made through the Internet using an ISP. What is common to all applicable environments is that the user accesses a public network, such as the Internet, through his computer, thereby accessing the computer software that embodies the invention.

Figure 3:
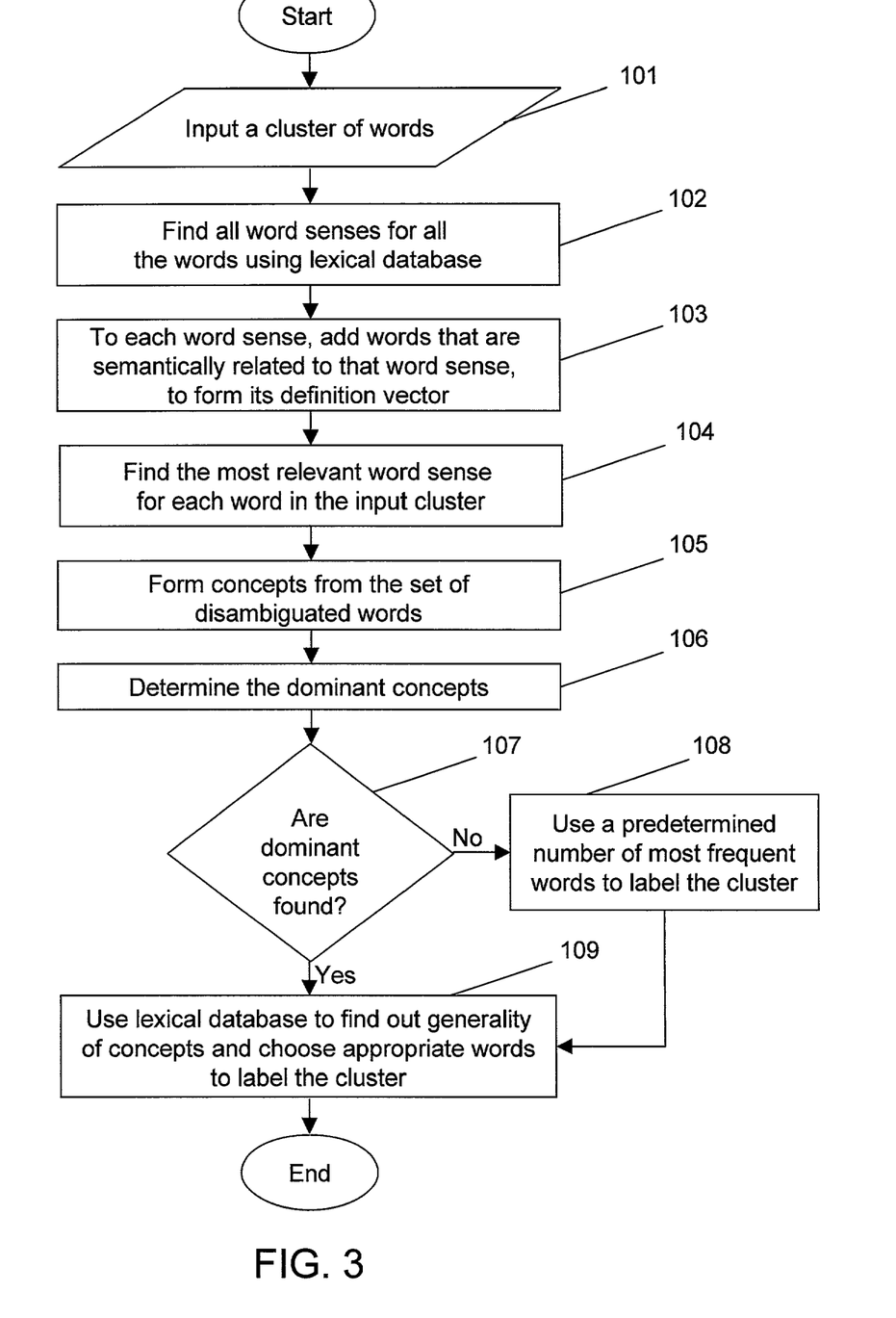
FIG. 3 is a flow chart that illustrates method of naming a cluster of words and phrases.
Figure 4:
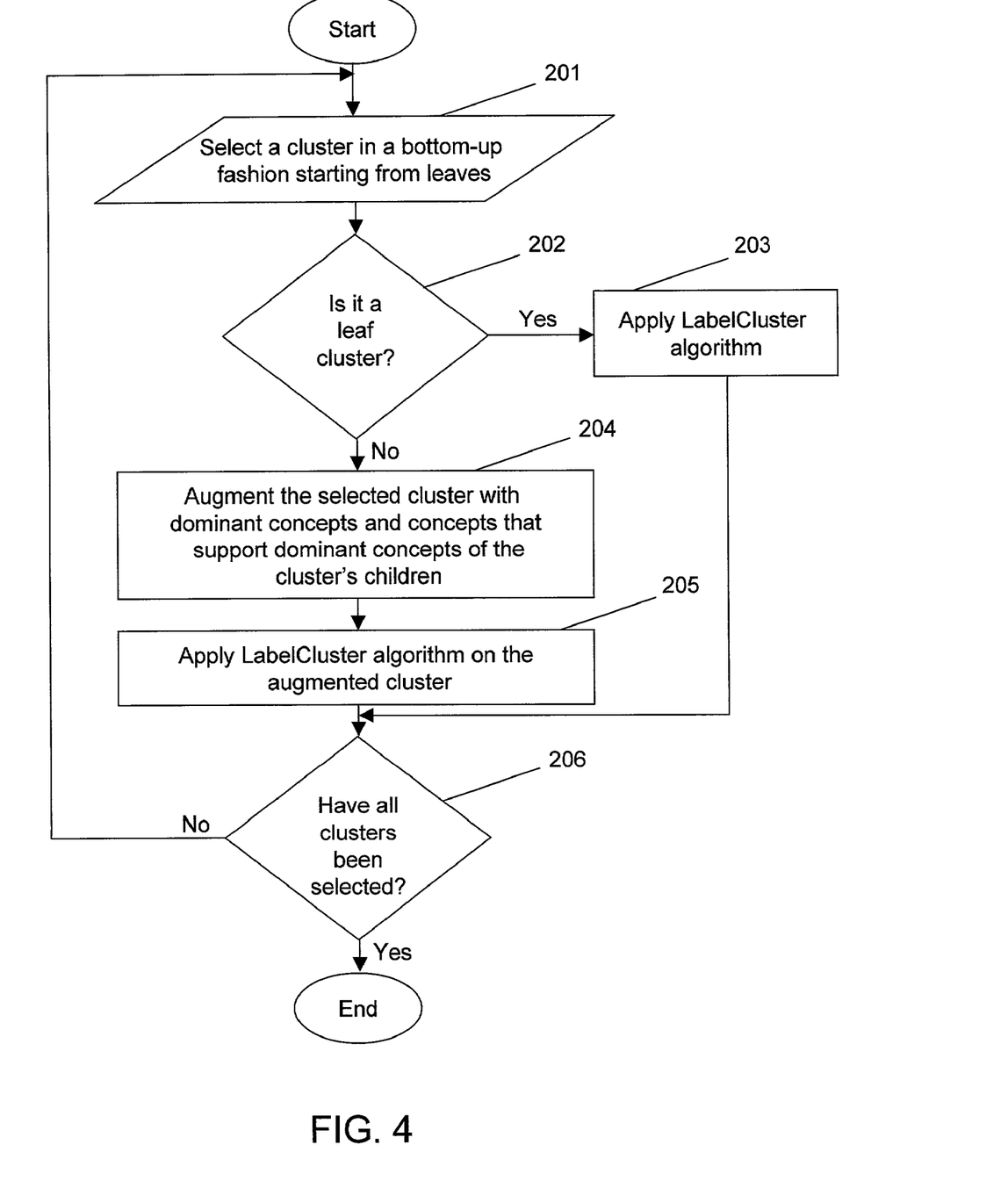
FIG. 4 is a flow chart that illustrates method of naming a cluster of words and phrases that are in a hierarchy.

The present invention provides for two methods, one of which is illustrated in FIG. 3 and the other one in FIG. 4. First method which is illustrated in FIG. 3 is called LabelCluster. This method pertains to naming a cluster of words and phrases that have already been extracted from a (one) document. In this case, the input is a certain number of words and phrases, already extracted from the document to be named, and the output is a name/label for the document.

The second method that is illustrated in FIG. 4 is called LabelHierarchy. This method essentially pertains to using LabelCluster to generated labels for a set of documents. By way of an example, let us assume that there are ten input documents that one wants to generate names/labels for. Certain words and phrases have been extracted from all these ten documents and are also given as input. Now, one possible way of labeling these documents is to apply LabelCluster method on all these documents one by one thereby generating ten such labels. This approach will be followed when these ten documents are not related to each other. But, it is also possible that there is some relationship among these documents. By way of an example, it can be assumed that two of these documents are related to 'human-beings', two of these to 'animals', two of these to 'plants', two of these to 'non-living things', two to 'living beings', and one to 'things'. In such a case, there is a relation between these documents. This is one of the possible heuristics that governs how the documents are related to each other. There are, of course, many other ways possible to define relation among the input set of documents. Using this relation, these documents can be organized in a hierarchy. By way of an example, 'things' could be the top-level document (node) in this hierarchy. Two possible children of this node are 'living beings' and 'non-living things'. As 'non-living things' does not have any children in this example, it will be referred to as a leaf node. 'human-beings', 'animals' and 'plants' are children of 'living beings', and because they don't have any children nodes, they are leaf nodes. Such a hierarchical structure is often referred to as a 'tree' with 'things' as the 'root' node, and 'human-beings', 'animals', 'plants' and 'non-living things' are referred to as leaf nodes.

In cases as the one described right above, LabelHierarchy method is used to label a hierarchy of documents by using information about the relation between these documents.

Referring now primarily to FIG. 3, an illustration of a method for naming a cluster of words and phrases, according to an embodiment of the present invention, is described in detail. LabelCluster provides a method for naming a cluster of words and phrases that have been extracted from a document, using a lexical database, which resides in storage 30.

A cluster of words (nouns and noun phrases) is inputted at 101 to the system. This cluster has already been extracted from a set of soft documents. A document may be a report, a website, a newspaper article etc. Each word in the input cluster is associated with a frequency, i.e. the number of times it occurs in the documents.

Thereafter, all possible senses of all the words inputted are generated at 102, using the lexical database. One of the possible lexical databases is WordNet (a lexical reference system developed by the Cognitive Science Laboratory of Princeton University). WordNet is a reference system in which words are organized in synonym sets, each representing one underlying lexical concept. There are cross-linkages linking the synonym sets, taking into account different relations (like synonyms, hypernyms, hyponyms, meronyms, metonyms, and troponyms). It is also used to find support of various words in various definition vectors; and also to find appropriate words that best describe the extracted dominant concepts.

The lexical database is used for meaning expansion and word sense disambiguation of the given words. Word sense of a word refers to a particular meaning of the word. For example, the word "care" has six word senses in Word Net They are: attention, aid—(the work of caring for or attending to someone or something; for example, "no medical care was required"); caution, forethought—(judiciousness in avoiding harm or danger; for example, "he exercised caution in opening the door"); concern, fear—(an anxious feeling; for example, "care had aged him"); care—(a cause for feeling concern; for example, "his major care was the illness of his wife"); charge, tutelage—(attention and management implying responsibility for safety; for example, "he is under the care of a physician"); maintenance, upkeep—(activity involved in maintaining something in good working order; for example, "he wrote the manual on car care").

After generating word senses for all the words in the input cluster, definitions of the words are further expanded using semantic relations. To do this, each of the word senses generated at 102, is augmented at 103, by words that are semantically related to the word sense e.g. synonyms, hypernyms, hyponyms, meronyms, metonyms, troponyms. By augmentation it is meant that to the word sense, these relations are added to form "definition vectors". The invention does not limit itself to these relations. A skilled reader in this art can see that this list is not an exhaustive one and one can opt for various other relations. The word sense along with these augmented words forms a "definition vector" for the word sense. Therefore, corresponding to each word sense, a definition vector is generated. A definition vector is a collection of words: it includes the word sense and words related to it i.e. synonyms etc.

Thereafter, word sense disambiguation is done at 104 i.e. for each word, the most relevant word sense is determined. This is done by finding out support for all the definition vectors for all the words and keeping the most relevant definition vector for each word based on their support. By way of an example, let us assume that there are five words, each with three word senses. This results in a total of fifteen definition vectors. However, there will be just one definition vector for each word after word sense disambiguation at 104 i.e. five definition vectors. To further illustrate upon the working of node 104, let us assume that the first word is picked to find out the most relevant word sense for that word. To do this, a word sense of the word is chosen and the support for that word sense is determined. In one embodiment of the present invention, the support for a word sense can be defined as the number of definition vectors which are similar to the definition vector corresponding to this word sense, from among the twelve other definition vectors relating to the remaining four words. Whether two definition vectors are similar can be determined using various similarity measures, the choice of which depends on the end-requirement. By way of an example, a similarity measure could be "Two definition vectors are assumed to be similar if they have a common feature". In this case, all the features (word senses augmented with other semantically related words and phrases such as hypernyms, hyponyms etc) of one definition vector are matched with all the features of the other definition vector. If more than, say, three features between the two definition vectors turn out to be matching, the corresponding definition vectors are declared as similar. A strict similarity measure could mean that two definition vectors are declared as similar only if more than, say, five features get matched between the definition vectors. A loose similarity measure could mean that a pair of definition vectors is declared as similar even if one feature is matched between the two definition vectors. Support of a definition vector is the number of such definition vectors that this particular definition vector is similar to. This entire process is repeated for the other two definition vectors of this word as well (as there were in all three word senses and hence three definition vectors for each word). The definition vector with the highest support amongst the three definition vectors is then chosen to be the most relevant definition vector for this word. This leads to disambiguation of word senses as for each word now, one has just one definition vector (instead of three before disambiguation). This entire disambiguation process is carried out for each word in the input cluster resulting in a total of five definition vectors.

The set of definition vectors resulting from the disambiguation process is divided into groups (or clusters) at 105. This can be done using various clustering methods known in the art. Rationale behind doing clustering is to form groups out of various disambiguated definition vectors. Let's say, there are five definition vectors to start with. The end result might be three groups/clusters with two, one, and two number of definition vectors respectively. Definition vectors in a cluster are assumed to have certain common properties i.e. it is expected that definition vectors in a cluster are 'similar' in 'some respect'. Each of these groups/clusters of definition vectors is called a concept. By way of an example, K-means clustering algorithm is a clustering method known in the art. There are several variants of K-means clustering algorithm, but most variants involve an iterative scheme that operates over a fixed number of clusters, while attempting to satisfy the following properties:

1. Each cluster has a center that is the mean position of all the elements/samples in that cluster.
2. Each element/sample is in the cluster whose center it is closest to.

Procedurally, this method initially takes the number of components of the population equal to the final required number of clusters. In this step itself the final required number of clusters is chosen such that the points are mutually farthest apart. Next, it examines each component in the population and assigns it to one of the clusters depending on the minimum distance. The centroid's position is recalculated every time a component is added to the cluster and this continues until all the components are grouped into the final required number of clusters.

The support for each of the concepts generated in the previous step is then determined and the concepts are ranked based on their support at 106. The support for a concept can be taken as the sum of the support of each of its member definition vectors, calculated with respect to the set of definition vectors resulting from the disambiguation process. Thereafter, a predetermined number of top ranked concepts above a certain threshold are chosen as the dominant concepts. The choice of threshold is again dependent on the end-requirement. If many dominant concepts with small support are desired, the threshold on similarity measure is kept strict. On the other hand, if a few dominant concepts with large support are desired, the threshold on similarity measures is kept loose. Interpretation of 'strict' and 'loose' can be analogously derived using preceding explanation of the same.

These dominant concepts are the ones that are related to a majority of words in the cluster. The number of top ranked concepts chosen as dominant concepts determines the number of concept names appearing in the final label. The user could specify this directly as the required number of terms in the final label or as a percentage of words of the number of words in the input cluster.

If no dominant concepts are found at 108, the document is labeled using a predetermined number of most frequent words from the input cluster. This case might arise if the input cluster consists of many proper nouns that do not appear in WordNet or any other lexical database that may be used or if the words in the input cluster are not lexically related.

If one or more dominant concept is found at 109, the lexical database is used to generate a term for each of these dominant concepts. For each of these dominant concepts, the set of terms corresponding to the group of definition vectors that corresponds to the concept is retrieved. If the terms in the set are of different generality (generality of a term can be determined by its depth in a lexical taxonomy such as WordNet), then the most general term is selected as the term to represent this concept. Otherwise, if there exist one or more words in the lexical database, which are the hypernym of more than one term in the set, then we select the word that is the hypernym of the most number of words in the set to represent this concept. Otherwise, the most frequent term in the set is selected to represent the concept. These set of terms form the final label for the input cluster.

Again, it is worth pointing out that a hierarchy is a tree representation of concepts wherein the deeper one goes into the tree, the more specific the concepts become. For example, at the top of the tree, the concept may be that of "sports;" this node may have two children, "winter sports" and "summer sports," and each of these may have further children such as winter sports may have ice skating, skiing and other related sports whereas summer sports may have soccer, football, and tennis as possible children. series of ordered groupings of clusters based on certain heuristics.

Note that FIG. 3 labels leafs clusters according to the method described above. It does this for all the leaf clusters. Thereafter, the method provided in FIG. 4 is invoked and this method labels a cluster that is not a leaf cluster. For labeling a cluster that is not a leaf cluster, it extracts the dominant concepts of the children of the cluster in addition to concepts formed from words in one or more children clusters. This way concepts with low supports in isolated children clusters but with high enough supports in the parent cluster are captured. This procedure is applied to all clusters in the hierarchy in a bottom up fashion starting from leaf clusters to top-level clusters. Details regarding FIG. 4 are given below.

Referring now primarily to FIG. 4, an illustration of a method for naming clusters of words and phrases in a hierarchy, according to an embodiment of the present invention, is described in detail. This method is termed as LabelHierarchy. LabelHierarchy provides for a method to do so using the lexical database residing in storage 30. One of the possible input hierarchy of clusters is in the form of a tree. The cluster in a tree that does not have any children is referred to as a leaf cluster. Children cluster of a cluster in a tree is a cluster that is linked to the cluster and is one level below the cluster. And the cluster that is one level up is called as a parent cluster. A cluster is chosen at 201 and checked to see if it is a leaf cluster at 202. If the cluster is a leaf cluster, it is labeled using LabelCluster at 203. If the cluster is not a leaf cluster, its label is derived from the dominant concepts of its children clusters in addition to concepts formed from words in one or more children clusters. This is done to ensure that concepts with low support in isolated children clusters but with high enough support in the parent cluster are captured. To do this, the words in the cluster are augmented with dominant concepts of its children clusters that are generated in previous iterations, and include words in children clusters that are similar to (or that support) the dominant concepts at 204. Thereafter, LabelCluster is applied to this updated cluster and an appropriate label is generated at 205.

This process is applied to all clusters in the concept hierarchy in a bottom-up fashion starting from leaf clusters to top-level clusters at 206. This ensures a reduction in time-complexity and also provides a basis for organizing a concept hierarchy in a general-to-specific fashion.

While the preferred embodiment of the present has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope the invention.

What is claimed is:

1. A method of naming a cluster of words and phrases extracted from a set of documents, using a lexical database, comprising the steps of:
   a. generating definition vectors of words in the cluster using the lexical database;
   b. determining support of the definition vectors;
   c. determining most relevant definition vector corresponding to each word in the cluster;
   d. generating concepts from the most relevant definition vectors using a preselected clustering method;
   e. determining support of said concepts;
   f. designating predetermined number of top ranked concepts as dominant concepts;
   g. naming the cluster by a predetermined number of most frequent words from the cluster, if the dominant concepts are not designated; and
   h. naming the cluster by choosing words from the lexical database that describe the dominant concepts in accurate detail, if the dominant concepts are designated.

2. The method according to claim 1, wherein one or more of the steps is embodied in a hardware chip.

3. The method according to claim 1, wherein said step of generating definition vectors, further comprises the steps of:
   a. determining all word senses of the words in the cluster using the lexical database;
   b. augmenting the word senses with words that are semantically related to the word sense, using the lexical database.

4. The method according to claim 3, wherein said step of augmenting the word senses with words that are semantically related to the word sense, using the lexical database, further comprises augmenting the word sense with its synonyms, hyponyms, hypernyms, meronyms and metonyms.

5. The method according to claim 1, wherein said step of determining support of the definition vectors, further comprises the steps of:
   a. designating a definition vector of a word as a selected definition vector;
   b. computing similarity measure between the selected definition vector and all other definition vectors of all other words;
   c. computing support of the selected definition vector by determining the number of definition vectors with which the similarity measure is above a predetermined threshold; and
   d. repeating steps a–c, if all the definition vectors of all the words have not been designated as the selected definition vector for determining their support.

6. The method according to claim 5, wherein said step of computing similarity measure between the selected definition vector and all other definition vectors of all other words, further comprises the steps of:
   a. designating a definition vector of a word as a chosen definition vector for computing its similarity measure with the selected definition vector;
   b. finding out the number of words that are common in the chosen definition vector and the selected definition vector;
   c. outputting the number of words as the similarity measure; and
   d. repeating steps a–c for all the definition vectors for all other the words.

7. The method according to claim 1, wherein said step of determining most relevant definition vector corresponding to each word in the cluster, further comprises the steps of:
   a. designating a word from the cluster as a selected word;
   b. choosing the definition vector with highest support among all other definition vectors for the selected word, as most relevant definition vector for the selected word; and
   c. repeating steps a-b for all words in the cluster.

8. The method according to claim 1, wherein said step of determining support of the concepts, further comprises the steps of:
   a. determining support of corresponding most relevant definition vectors; and
   b. determining support of the concepts by adding support of corresponding most relevant definition vectors.

9. The method according to claim 8, wherein said step of determining support of corresponding most relevant definition vectors, further comprises the steps of:
   a. designating a most relevant definition vector of the concept as a selected definition vector;
   b. computing similarity measure between the selected definition vector and all other most relevant definition vectors of all other concepts;
   c. computing support of the selected definition vector by finding out the number of most relevant definition vectors with which the similarity measure is above a predetermined threshold; and
   d. repeating steps a–c, if all the most relevant definition vectors of all the concepts have not been designated as the selected definition vector for determining their support.

10. The method according to claim 1, wherein said step of naming the cluster by choosing words from the lexical database that describe the dominant concepts in accurate detail, if dominant concepts are found, further comprises the steps of:
   a. designating a word from the dominant concepts as a designated concept, to generate an appropriate name for the cluster, using the designated concept and the lexical database;
   b. generating the designated concept's hypernyms and hyponyms using the lexical database;
   c. determining depth of the designated concept using the lexical database;
   d. repeating steps a-c for rest of words in the dominant concepts; and
   e. choosing words from the lexical database that best describes essence of the cluster using generated hypernyms and hyponyms, and the determined depths.

11. A system for naming a cluster of words and phrases extracted from a document, using a lexical database, comprising:
   a. means for generating definition vectors of words in said cluster using said lexical database;
   b. means for determining support of said definition vectors;
   c. means for determining most relevant definition vector corresponding to each said word in said cluster;
   d. means for generating concepts from said most relevant definition vectors;
   e. means for determining support of said concepts;
   f. means for designating predetermined number of top ranked said concepts as dominant concepts; and
   g. means for naming said cluster using said dominant concepts.

12. The system according to claim 11, wherein said means for generating definition vectors, comprises:
   a. means for determining all word senses of said words in said cluster, using said lexical database; and
   b. means for augmenting said word senses with words that are semantically related to said word sense, using said lexical database.

13. The system according to claim 12, wherein said augmenting means augments said word sense with its synonyms, hyponyms, hypernyms, meronyms and metonyms.

14. The system according to claim 11, wherein said means for determining support of said definition vectors, comprises:
   a. means for designating a definition vector of a word as a selected definition vector;
   b. means for computing similarity measure between said selected definition vector and all other definition vectors of all other words; and
   c. means for computing support of said selected definition vector.

15. The system according to claim 14, wherein said means for computing similarity measure between said selected definition vector and all other definition vectors of all other words, comprises:
   a. means for designating a definition vector of a word as a chosen definition vector for computing its similarity measure with said selected definition vector;
   b. means for finding out the number of words that are common in said chosen definition vector and said selected definition vector; and
   c. means for outputting said number of words as the similarity measure.

16. The system according to claim 11, wherein said means for determining most relevant definition vector corresponding to each said word in said cluster, comprises:
   a. means for designating a word from said cluster as a selected word; and
   b. means for choosing said definition vector with highest support among all other said definition vectors for said selected word, as most relevant definition vector for said selected word.

17. The system according to claim 11, wherein said means for determining support of said concepts, comprises:
   a. means for determining support of corresponding said most relevant definition vectors; and
   b. means for determining support of said concepts by adding support of corresponding said most relevant definition vectors.

18. The system according to claim 17, wherein said means for determining support of corresponding said most relevant definition vectors, comprises:
   a. means for designating said most relevant definition vector of said concept as a selected definition vector;
   b. means for computing similarity measure between said selected definition vector and all other most relevant definition vectors of all other said concepts; and
   c. means for computing support of said selected definition vector by finding out the number of said most relevant definition vectors with which said similarity measure is above a pre-determined threshold.

19. The system according to claim 11, wherein said means for naming said cluster using said dominant concepts, comprises:
   a. means for designating a word from said dominant concepts as a designated concept, to generate an appropriate name for said cluster, using said designated concept and said lexical database;

b. means for generating said designated concept's hypernyms and hyponyms using said lexical database;
c. means for determining depth of said designated concept using said lexical database; and
d. means for choosing words from said lexical database that best describes essence of said cluster using said generated hypernyms and hyponyms, and said determined depths.

20. A computer program product for naming a cluster of words and phrases, extracted from a document, using a lexical database, the computer program product embodied in a computer-readable medium and comprising:
   a. computer-readable program code means for generating definition vectors of words in said cluster using said lexical database;
   b. computer-readable program code means for determining support of said definition vectors;
   c. computer-readable program code means for determining most relevant definition vector corresponding to each said word in said cluster;
   d. computer-readable program code means for generating concepts from said most relevant definition vectors;
   e. computer-readable program code means for determining support of said concepts;
   f. computer-readable program code means for designating predetermined number of top ranked said concepts as dominant concepts; and
   g. computer-readable program code means for naming said cluster using said dominant concepts.

21. The computer program product according to claim 20, wherein said computer-readable program code means for generating definition vectors, comprises:
   a. computer-readable program code means for determining all word senses of said words in said cluster, using said lexical database; and
   b. computer-readable program code means for augmenting said word senses with words that are semantically related to said word sense, using said lexical database.

22. The computer program product according to claim 21, wherein said computer-readable program code augmenting means augments said word sense with its synonyms, hyponyms, hypernyms, meronyms and metonyms.

23. The computer program product according to claim 20, wherein said computer-readable program code means for determining support of said definition vectors, comprises:
   a. computer-readable program code means for designating a definition vector of a word as a selected definition vector;
   b. computer-readable program code means for computing similarity measure between said selected definition vector and all other definition vectors of all other words; and
   c. computer-readable program code means for computing support of said selected definition vector.

24. The computer program product according to claim 23, wherein said computer-readable program code means for computing similarity measure between said selected definition vector and all other definition vectors of all other words, comprises:
   a. computer-readable program code means for designating a definition vector of a word as a chosen definition vector for computing its similarity measure with said selected definition vector;
   b. computer-readable program code means for finding out the number of words that are common in said chosen definition vector and said selected definition vector; and
   c. computer-readable program code means for outputting said number of words as the similarity measure.

25. The computer program product according to claim 20, wherein said computer-readable program code means for determining most relevant definition vector corresponding to each said word in said cluster, comprises:
   a. computer-readable program code means for designating a word from said cluster as a selected word; and
   b. computer-readable program code means for choosing said definition vector with highest support among all other said definition vectors for said selected word, as most relevant definition vector for said selected word.

26. The computer program product according to claim 20, wherein said computer-readable program code means for determining support of said concepts, comprises:
   a. computer-readable program code means for determining support of corresponding said most relevant definition vectors; and
   b. computer-readable program code means for determining support of said concepts by adding support of corresponding said most relevant definition vectors.

27. The computer program product according to claim 26, wherein said computer-readable program code means for determining support of corresponding said most relevant definition vectors, comprises:
   a. computer-readable program code means for designating said most relevant definition vector of said concept as a selected definition vector;
   b. computer-readable program code means for computing similarity measure between said selected definition vector and all other most relevant definition vectors of all other said concepts; and
   c. computer-readable program code means for computing support of said selected definition vector by finding out the number of said most relevant definition vectors with which said similarity measure is above a pre-determined threshold.

28. The computer program product, according to claim 20, wherein said computer-readable program code means for naming said cluster using said dominant concepts, comprises:
   a. computer-readable program code means for designating a word from said dominant concepts as a designated concept, to generate an appropriate name for said cluster, using said designated concept and said lexical database;
   b. computer-readable program code means for generating said designated concept's hypernyms and hyponyms using said lexical database;
   c. computer-readable program code means for determining depth of said designated concept using said lexical database; and
   d. computer-readable program code means for choosing words from said lexical database that best describes essence of said cluster using said generated hypernyms and hyponyms, and said determined depths.

29. A method of naming clusters of words and phrases extracted from a set of documents in a hierarchy that is in the form of a tree, using a lexical database, comprising the steps of:
   a. designating a cluster from the hierarchy of clusters as a selected cluster;
   b. determining whether the selected cluster is a leaf cluster in the hierarchy;
   c. if the selected cluster is a leaf cluster, performing the steps of:
      i. designating the selected cluster as an updated cluster;

ii. generating definition vectors of words in the updated cluster using the lexical database;
iii. determining support of the definition vectors;
iv. determining most relevant definition vector corresponding to each word in the updated cluster;
v. generating concepts from the most relevant definition vectors using a preselected clustering method;
vi. determining support of the concepts;
vii. designating predetermined number of top ranked concepts as dominant concepts;
viii. naming the selected cluster by a predetermined number of most frequent words from the cluster, if the dominant concepts are not designated; and
ix. naming the selected cluster by choosing words from the lexical database that describe the dominant concepts in accurate detail, if the dominant concepts are designated;
d. if the selected cluster is not a leaf cluster, performing the steps of:
i. augmenting the selected cluster with already generated dominant concepts of the selected cluster's children clusters;
ii. augmenting the selected cluster with concepts of the selected cluster's children clusters that may not be dominant in that children cluster;
iii. designating augmented cluster as an updated cluster;
iv. generating definition vectors of words in the updated cluster using the lexical database;
v. determining support of the definition vectors;
vi. determining most relevant definition vector corresponding to each word in the updated cluster;
vii. generating concepts from the most relevant definition vectors using a preselected clustering method;
viii. determining support of the concepts;
ix. designating predetermined number of top ranked concepts as dominant concepts;
x. naming the selected cluster by a predetermined number of most frequent words from the cluster, if the dominant concepts are not designated; and
xi. naming the selected cluster by choosing words from the lexical database that describe the dominant concepts in accurate detail, if the dominant concepts are designated;
e. if all clusters of the hierarchy of clusters have not been designated as the selected cluster for naming, repeating steps a–d.

30. The method according to claim 29, wherein one or more of the steps is embodied in a hardware chip.

31. The method according to claim 29, wherein said step of generating definition vectors, further comprises the steps of:
a. determining all word senses of the words in the updated cluster using the lexical database;
b. augmenting the word senses with words that are semantically related to the word sense, using the lexical database.

32. The method according to claim 31, wherein said step of augmenting the word senses with words that are semantically related to the word sense, using the lexical database, further comprises augmenting the word sense with its synonyms, hyponyms, hypernyms, meronyms and metonyms.

33. The method according to claim 29, wherein said step of determining support of the definition vectors, further comprises the steps of:
a. designating a definition vector of a word as a selected definition vector;
b. computing similarity measure between the selected definition vector and all other definition vectors of all other words;
c. computing support of the selected definition vector by finding out the number of definition vectors with which the similarity measure is above a predetermined threshold; and
d. if all definition vectors of all the words have not been designated as the selected definition vector for determining their support, repeating steps a–c.

34. The method according to claim 33, wherein said step of computing similarity measure between the selected definition vector and all other definition vectors of all other words, further comprises the steps of:
a. designating a definition vector of a word as a chosen definition vector for computing its similarity measure with the selected definition vector;
b. finding out the number of words that are common in the chosen definition vector and the selected definition vector;
c. outputting the number of words as the similarity measure; and
d. repeating steps a–c for all the definition vectors for all other the words.

35. The method according to claim 29, wherein said step of determining most relevant definition vector corresponding to each word in the updated cluster, further comprises the steps of:
a. designating a word from the updated cluster as a selected word;
b. choosing the definition vector with highest support among all other definition vectors for the selected word, as most relevant definition vector for the selected word; and
c. repeating steps a-b for all words in the updated cluster.

36. The method according to claim 29, wherein said step of determining support of the concepts, further comprises the steps of:
a. determining support of corresponding most relevant definition vectors; and
b. determining support of the concepts by adding support of corresponding most relevant definition vectors.

37. The method according to claim 36, wherein said step of determining support of corresponding most relevant definition vectors, further comprises the steps of:
a. designating a most relevant definition vector of the concept as a selected definition vector;
b. computing similarity measure between the selected definition vector and all other most relevant definition vectors of all other concepts;
c. computing support of the selected definition vector by finding out the number of most relevant definition vectors with which the similarity measure is above a predetermined threshold; and
d. repeating steps a–c, if all the most relevant definition vectors of all the concepts have not been designated as the selected definition vector for determining their support.

38. The method according to claim 29, wherein said step of naming the selected cluster by choosing words from the lexical database that describe the dominant concepts in accurate detail, if dominant concepts are found, comprises the steps of:
a. designating a word from the dominant concepts as a designated concept, to generate an appropriate name for the selected cluster, using the designated concept and the lexical database;

b. generating the designated concept's hypernyms and hyponyms using the lexical database;
c. determining depth of the designated concept using the lexical database;
d. repeating steps a–c for rest of words in the dominant concepts; and
e. choosing words from the lexical database that best describes essence of the updated cluster using the generated hypernyms and hyponyms, and the determined depths.

39. A system for naming clusters of words and phrases extracted from a set of documents in a hierarchy that is in the form of a tree, using a lexical database, comprising:
a. means for selecting a cluster of words and phrases from said hierarchy of clusters;
b. means for updating said cluster depending upon whether said cluster is a leaf cluster or not;
c. means for generating definition vectors of words in said updated cluster using said lexical database;
d. means for determining support of said definition vectors;
e. means for determining most relevant definition vector corresponding to each said word in said updated cluster;
f. means for generating concepts from said most relevant definition vectors using a preselected clustering method;
g. means for determining support of said concepts;
h. means for designating predetermined number of top ranked said concepts as dominant concepts; and
i. means for naming said cluster using said dominant concepts.

40. The system according to claim 39, wherein said means for generating definition vectors, comprises:
a. means for determining all word senses of said words in said updated cluster, using said lexical database; and
b. means for augmenting said word senses with words that are semantically related to said word sense, using said lexical database.

41. The system according to claim 40, wherein said augmenting means augments said word sense with its synonyms, hyponyms, hypernyms, meronyms and metonyms.

42. The system according to claim 39, wherein said means for determining support of said definition vectors, comprises:
a. means for designating a definition vector of a word as a selected definition vector;
b. means for computing similarity measure between said selected definition vector and all other definition vectors of all other words;
c. means for computing support of said selected definition vector.

43. The system according to claim 42, wherein said means for computing similarity measure between said selected definition vector and all other definition vectors of all other words, comprises:

a. means for designating a definition vector of a word as a chosen definition vector for computing its similarity measure with said selected definition vector;
b. means for finding out the number of words that are common in said chosen definition vector and said selected definition vector; and
c. means for outputting said number of words as the similarity measure.

44. The system according to claim 39, wherein said means for determining most relevant definition vector corresponding to each said word in said updated cluster, comprises:
a. means for designating a word from said updated cluster as a selected word; and
b. means for choosing said definition vector with highest support among all other said definition vectors for said selected word, as most relevant definition vector for said selected word.

45. The system according to claim 39, wherein said means for determining support of said concepts, comprises:
a. means for determining support of corresponding said most relevant definition vectors; and
b. means for determining support of said concepts by adding support of corresponding said most relevant definition vectors.

46. The system according to claim 45, wherein said means of determining support of corresponding said most relevant definition vectors, comprises:
a. means for designating a most relevant definition vector of said concept as a selected definition vector;
b. means for computing similarity measure between said selected definition vector and all other most relevant definition vectors of all other said concepts; and
c. means for computing support of said selected definition vector by finding out the number of said most relevant definition vectors with which said similarity measure is above a predetermined threshold.

47. The system according to claim 39, wherein said means for naming said cluster using said dominant concepts, comprises:
a. means for designating a word from said dominant concepts as a designated concept, to generate an appropriate name for said cluster, using said designated concept and said lexical database;
b. means for generating said designated concept's hypernyms and hyponyms using said lexical database;
c. means for determining depth of said designated concept using said lexical database; and
d. means for choosing words from said lexical database that best describes essence of said updated cluster using said generated hypernyms and hyponyms, and said determined depths.

48. The system as claimed in claim 39 wherein the system comprises a computer program for use in a stored program computer.

* * * * *